(12) United States Patent
Buck et al.

(10) Patent No.: US 6,823,730 B2
(45) Date of Patent: Nov. 30, 2004

(54) CAPACITIVE FILL LEVEL MEASUREMENT DEVICE

(75) Inventors: Bernd Buck, Nonnenhorn (DE); Jochen Gundlach, Tettnang (DE); Jaromir Palata, Friedrichashafen (DE)

(73) Assignee: i f m electronic GmbH, Essen (DE)

(*) Notice: Subject to any disclaimer, the term of this patent is extended or adjusted under 35 U.S.C. 154(b) by 191 days.

(21) Appl. No.: 09/789,698

(22) Filed: Feb. 22, 2001

(65) Prior Publication Data

US 2001/0037680 A1 Nov. 8, 2001

(30) Foreign Application Priority Data

Feb. 22, 2000 (DE) .......................................... 100 08 093

(51) Int. Cl.[7] .............................................. G01F 23/00
(52) U.S. Cl. ................... 73/304 C; 73/304 C; 361/284; 324/658; 340/620
(58) Field of Search ...................... 73/304 C; 361/284; 324/658; 340/620

(56) References Cited

U.S. PATENT DOCUMENTS

| | | | |
|---|---|---|---|
| 3,935,739 A | | 2/1976 | Ells |
| 4,003,259 A | * | 1/1977 | Hope .......................... 361/284 |
| 4,099,167 A | * | 7/1978 | Pomerantz et al. .......... 340/620 |
| 4,350,039 A | | 9/1982 | van Dyke et al. |
| 4,350,040 A | | 9/1982 | Fasching et al. |
| 4,417,473 A | * | 11/1983 | Tward et al. ................ 361/284 |
| 4,589,077 A | | 5/1986 | Pope |
| 4,780,705 A | | 10/1988 | Beane |
| 5,142,909 A | | 9/1992 | Baughman |
| 5,406,843 A | | 4/1995 | Hannan et al. |
| 5,477,727 A | * | 12/1995 | Koga .......................... 361/284 |
| 6,259,608 B1 | * | 7/2001 | Berardinelli et al. ........ 361/777 |

FOREIGN PATENT DOCUMENTS

| | | |
|---|---|---|
| DE | 196 44 777 C1 | 6/1998 |
| DE | 198 13 013 A1 | 9/1999 |
| EP | 0 916 930 | 5/1999 |
| EP | 0 926 474 | 6/1999 |
| FR | 2 662 249 | 11/1991 |

* cited by examiner

Primary Examiner—Hezron Williams
Assistant Examiner—André K. Jackson
(74) Attorney, Agent, or Firm—Nixon Peabody LLP; David S. Safran (57) ABSTRACT

A capacitive fill level measurement device with a fill level sensor having a plurality of sensor fields, electrical wires for electrically connecting the plurality of sensor fields to a multipole side of a selector switch, and a power supply and evaluation circuit electrically connected to a monopole side of the selector switch. The capacitive fill level measurement device can be made with simple production technology and thus economically for a host of different applications using a matrix of printed conductors which extend vertically and horizontally such that each horizontally extending printed conductor on one side is connected to one sensor field and on the other side connected to a vertically extending printed conductor. Each horizontally extending printed conductor is connected with a respective vertically extending printed conductor to form an electrical line or a part of an electrical line.

15 Claims, 7 Drawing Sheets

CAPACITIVE FILL LEVEL MEASUREMENT DEVICE

BACKGROUND OF THE INVENTION

1. Field of the Invention

The present invention relates generally to a capacitive fill level measurement device with a fill level sensor which has several sensor fields, with electrical wires connected to the sensor fields of the fill level sensor, with a selector switch connected by its multipole side to ends of the wires away from the sensor fields of the fill level sensor, and with a power supply and evaluation circuit which is connected to the monopole side of the selector switch, the sensor fields of the fill level sensor being made planiform and located on top of one another, and consisting preferably of metal.

2. Description of the Related Art

Capacitive fill level measurement devices are used for capacitive acquisition of the fill level of liquids, bulk materials and other loads in a closed or an open container and are common (compare, for example, German patent publication DE 196 44 777, European patent disclosure documents 0 916 930, 0 926 474, French patent disclosure document FR 2 662 249, U.S. Pat. Nos. 3,935,739, 4,350,039, 4,350,040, 4,589,077, 4,780,705, 5,142,909 and 5,406,843).

In capacitive fill level measurement devices, in terms of measurement engineering, the fact is often used that the load with a fill level which is to be determined influences the capacitance between the fill level sensor or between a sensor field of the fill level sensor on and a conventional reference electrode. This is because the dielectric constant of the load, which is also important for the capacitance between the fill level sensor or between one sensor field of the fill level sensor and the reference electrode differs from the dielectric constant of air. Consequently, as described above, capacitive fill level measurement devices of the type under consideration here as dictated by the needs of operation include a fill level sensor which has several sensor fields, a power supply and evaluation circuit.

As necessary, the sensor fields of the fill level sensor can be connected to the power supply and the evaluation circuit. This is done by the electrical wires which are connected to the sensor fields of the fill level sensor and the selector switch, which is connected by its multipole side to the ends of the wires away from the sensor fields of the fill level sensor, and the power supply and evaluation circuit is connected to its monopole side. The selector switch, therefore, as dictated by the requirements of operation on the one side, called the multipole side, has a plurality of terminals, while on the other side, called the monopole side, there is only one terminal; the selector switch therefore makes it possible to electrically connect one selectable terminal of the multipole side to the terminal of the monopole side or vice versa.

In examining the power supply and evaluation circuit in functional terms, it includes a power supply circuit and an evaluation circuit; while the power supply circuit is used to make available the necessary power supply voltage and the necessary power supply current to the fill level sensor, using the evaluation circuit the fill level of the load is determined, therefore, it is determined which sensor field of the fill level sensor has already been or is no longer being or has not yet reached by the load. With reference to the selector switch which can be made, for example, as a multiplexer (compare German patent publication DE 196 44 777) it can be stated that for the power supply function the power supply and evaluation circuit can be connected from the terminal of the monopole side to the terminal of the multipole side, while for the evaluation function the sensor field of the fill level sensor can be connected via the terminal of the multipole side and the terminal of the monopole side to the power supply and evaluation circuit.

It was stated initially that in the capacitive fill level measurement device underlying the invention (compare German patent publication DE 196 44 777), the sensor fields of the fill level sensor are made planiform and are located on top of one another and consist preferably of metal. Here planiform does not mean that the sensor field should be made essentially only two-dimensionally, but rather, only that the two-dimensional execution is significant, because for determining the fill level a change of the capacitance between a sensor field which acts as the measurement electrode and a conventional reference electrode is significant. The sensor elements are located on top of one another with respect to the fact that the fill level of a load located in a vessel is to be determined means only that the sensor fields is their geometrical extension are in any case also located on top of one another. Accordingly, the sensor fields can also be located next to one another and also overlapping on top of and/or next to one another. Ultimately, the sensor fields of the fill level sensor need not consist of metal; what is important with respect to material is in turn that each sensor field must be suitable as a measurement electrode, therefore must be suitable for accomplishing a capacitance which is changed by a changing dielectric constant, together with only one electrode.

SUMMARY OF THE INVENTION

An object of the invention is to devise a capacitive fill level measurement device of the type under consideration and described above, which can be manufactured with simple production technology and economically for a host of different applications and/or which largely meets the requirements of today in terms of electricity.

The capacitive fill level measurement device in accordance with the present invention is characterized by either electrical-mechanical, electrical-construction, or electrical-geometrical measures, and, in addition to the sensor fields which are located on top of one another, on one side or on both sides there includes a matrix of printed conductors which run vertically and horizontally, each horizontally running printed conductor on one side is connected to one sensor field and on the other side to a vertically running printed conductor, and each horizontally running printed conductor with the vertically running printed conductor which is connected to it forms an electrical line or a part of an electrical line.

It is important for the capacitive fill level measurement device in accordance with the present invention has a fill level sensor which is made such that the individual sensor fields are implemented, activated or connected to the electrical wires, or are provided with electrical wires in manner which is advantageous over conventional prior art devices. The special fill level sensor built in accordance with the present invention consists mainly in that the matrix provided next to the sensor fields including horizontally and vertically running printed conductors makes it possible to use a starting material for the fill level sensor which can be used for a host of different applications, in particular, different fill level measurement devices.

One such starting material which includes a conductor support, made preferably planiform, of a plurality of sensor fields which are made on top of one another in one plane parallel to the plane of the conductor support, which are made planiform and which are provided on the conductor support. and a matrix which is provided next to the sensor fields, on one side or on both sides, consisting of horizontally and vertically running printed conductors, all horizontal printed conductors with all vertical printed conductors being connected to one another so that all horizontal printed conductors and all vertical printed conductors are electrically connected to one another.

In the above described starting material for a fill level sensor, has several sensor fields, therefore, the sensor fields, horizontal printed conductors and vertical printed conductors are electrically connected to one another. In addition, the sensor fields, horizontal printed conductors and vertical printed conductors are at the same potential, this, of course, is not functionally compatible for the later use of a specific fill level sensor of a specific capacitive fill level measurement device. Consequently, the above described starting material must be processed in a special way for the fill level sensor of a capacitive fill level measurement device, which sensor has several sensor fields. Therefore, a special process is necessary for producing a fill level sensor which has several sensor fields and which can be used for a capacitive fill level measurement device from the above described starting material. This process is characterized in that, except for the horizontal printed conductors and the vertical printed conductors which are to be connected to one another as necessary for operation, all other horizontal printed conductors and vertical printed conductors are separated from one another such that only the horizontal printed conductors and the vertical printed conductors which are to be connected to one another as is necessary for operation are in fact connected to one another.

The capacitive fill level measurement device in accordance with the present invention is characterized in a second embodiment by electrical-functional and electronic-functional measures, whereby the power supply and evaluation circuit delivers a high frequency power supply voltage, the power supply voltage is frequency-spread by a noise signal originating from a noise source. The frequency-spread power supply voltage leads to at least one of a frequency-spread measurement quantity, a measurement voltage or a measurement current. The frequency-spread power supply voltage is placed at the first input of the correlator and the frequency-spread measurement quantity is placed at the second input of the correlator and the output signal of the correlator is supplied to the other evaluation circuit.

The capacitive fill level measurement device in accordance with the present invention is a so-called open electronic system, i.e., the sensor surfaces of the fill level sensor cannot be entirely shielded, and thus, emit electromagnetic radiation and signals into the environment and vice versa absorb electromagnetic radiation and signals from the environment. This circumstance can lead to noise emissions of the capacitive fill level measurement device and also lead to incident noise emissions. Accordingly, this problem is important in capacitive fill level measurement devices of the type under consideration because the distance between the sensor elements of the fill level sensor and the power supply and evaluation circuit can be considerable.

By means of the above described electrical-functional and electronic-functional measures, a capacitive fill level measurement device is formed in which the noise emission and the sensitivity to incident noise emissions are relatively low. The frequency spreading of the power supply voltage which takes place by means of a noise signal reduces the bandwidth and thus the spectral energy density of the power supply voltage on the one hand and the measurement quantity on the other without needing to reduce the power supply voltage on the sensor elements. In this way, the amplitude of the emitted noise signals is reduced if the maximum allowable amplitude of the noise signals emitted into the capacitive fill level measurement device in accordance with the present invention is increased. Thus, both the disruption of other devices by the capacitive fill level measurement device in accordance with the present invention as well as the sensitivity of the fill level measurement device to noise from by other devices are reduced.

With respect to what can be achieved in particular by the frequency spreading of the power supply voltage and along with this by the frequency spreading of the measurement quantity and how the teaching "frequency spreading" can be implemented in particular, in order to avoid repetitions reference is made to all the disclosure contents of German patent disclosure document 198 13 013, reference being made expressly for the disclosure content of this patent application.

Finally, the capacitive fill level measurement device in accordance with the present invention in a third embodiment is characterized by other electrical-functional and electronic-functional measures, a electrically conductive shield is assigned to the sensor fields and/or the wires and/or the selector switch whereby the electrically conductive shield is always at a potential which corresponds essentially to the potential of the sensor fields, the wires and the selector switch. The above described measure of assigning the electrically conductive shield to the sensor fields and/or the wires and/or the selector switch is used for the same purposes for which the teaching "frequency spreading" is also used. Specifically, to reduce the amplitude of the emitted noise signals, and to increase the maximum allowable amplitude of the noise signal emitted into the capacitive fill level measurement device in accordance with the present invention.

The aforementioned teaching "shield" is associated with the problem that the shield represents a capacitive load of the sensor fields and/or the wires and/or the selector switch. This problem is eliminated when, as provided in accordance with the present invention, the electrically conductive shield is always at a potential which essentially corresponds to the potential of the sensor fields, the wires and the selector switch. If at no time there is a potential difference between the electrically conductive shield and the sensor fields or the wires and the selector switch, a current which represents a capacitive load cannot flow, regardless of how large the capacitance is between the electrically conductive shield and the sensor fields or the wires and the selector switch.

The measure of providing for the electrically conductive shield to always be at a potential which essentially corresponds to the potential of the sensor fields, the wires and the selector switch can in particular be implemented by the potential of the electrically conductive shield being obtained from the potential of the sensor fields, the wires and the selector switch via the control of the potential of the electrically conductive shield. But this approach has the disadvantage that a control deviation is always necessary and that special problems occur in dynamic processes.

With reference to the measure "potential equality" which was treated individually above, another teaching of the invention which acquires special importance states that the electrically conductive shield is connected via a current measurement circuit to the sensor fields, the wires and the selector switch and the current measurement circuit has an essentially negligibly small internal resistance. This current measurement circuit can includes a synchronous rectifier, a lowpass connected downstream of the synchronous rectifier, and a current-voltage converter which is connected downstream of the lowpass. In this current measurement circuit the synchronous rectifier and the downstream lowpass lead to the fact that a direct current is formed from the high frequency measurement current which is supplied on the inlet side and from it then a dc voltage is formed by the current-voltage converter.

In the prior art, it is quite generally common to implement voltages as a potential difference to the frame potential or to the ground potential, i.e., that one output of a corresponding voltage source "is high", while the other output is connected to the frame potential or the ground potential. In the past, "frame potential or ground potential" was always stated carefully, because often, if not quite ordinarily, the frame potential and the ground potential are the same. In a preferred embodiment of the capacitive fill level measurement device in accordance with the present invention, there is a difference which is characterized in that the power supply voltage which is made available by the power supply and evaluation circuit is between the ground potential and the frame potential, thereby a "floating" frame potential is accomplished.

In doing so, of course, provisions must be made for the frame potential and the ground potential not be connected to one another without impedance. Consequently, it is recommended that the power supply circuit of the power supply and evaluation circuit be connected dc-decoupled to the ground potential, for example, by a decoupling capacitor. On the other hand, the evaluation circuit of the power supply and evaluation circuit is connected ac-decoupled to the ground potential, for example, by at least one current-compensated interaction limiting reactor, preferably, by several current-compensated interaction limiting reactors.

An object of the invention is to devise a capacitive fill level measurement device which can be economically built for a host of different applications. This means that the fill level measurement device in accordance with the present invention can be used for acquiring or determining the fill level of loads with quite different dielectric constants and for acquiring or determining the fill level of loads in quite different containers. To accomplish this, preferred embodiments of the fill level measurement device in accordance with the present invention are characterized in that the frequency of the power supply voltage can be controlled, for example, by a microprocessor and/or the gain of the evaluation circuit of the power supply and evaluation circuit can be controlled, preferably, in turn by a microprocessor. These measures, used alternatively or cumulatively, make it possible to consider the very different dielectric constants of the loads and very different embodiments, especially very different geometries of the containers which hold the loads. This is done with the objective of arriving at measurement results which are as accurate as possible and which can be processed as easily as possible, especially with the objective of optimally using the possibilities of the evaluation circuit of the power supply and evaluation circuit, specifically using the existing control range without overload occurring.

As was stated above, one preferred embodiment of the fill level measurement device in accordance with the present invention is characterized in that a electrically conductive shield is assigned to the sensor fields and/or the wires and/or the selector switch and that the electrically conductive shield is always at a potential which corresponds essentially to the potential of the sensor fields, the wires and the selector switch. In this embodiment therefore the electrically conductive shield is not at a constant potential, specifically the ground potential; rather radiation and signals are easily emitted into the environment via this electrically conductive shield and this electrically conductive shield is easily able to absorb radiation and signals from the environment. To prevent this, another teaching of the invention is to provide a second electrically conductive shield which is used to electrically conductive shield the first electrically conductive shield, the second electrically conductive shield preferably being at the ground potential. Via the second electrically conductive shield the first electrically conductive shield, and thus, the sensor fields, the wires, and the selector switch are shielded "in the classical sense".

In the above described embodiment of a capacitive fill level measurement device having a second electrically conductive shield which is at ground potential, the second electrically conductive shield, of course, represents a capacitive load of the first electrically conductive shield, therefore, a current flows from the first electrically conductive shield to the second electrically conductive shield and vice versa. But this does not affect the measurement results when, as is preferably provided, the first electrically conductive shield is connected via a current measurement circuit to the sensor fields, the wires, and the selector switch and the current measurement circuit has an essentially negligibly small internal resistance. Specifically, the measurement current flowing via the current measurement circuit is not influenced by the current which results from the capacitive loading of the first electrically conductive shield by the second electrically conductive shield.

DETAILED DESCRIPTION OF THE PREFERRED EMBODIMENTS

Figure 1:
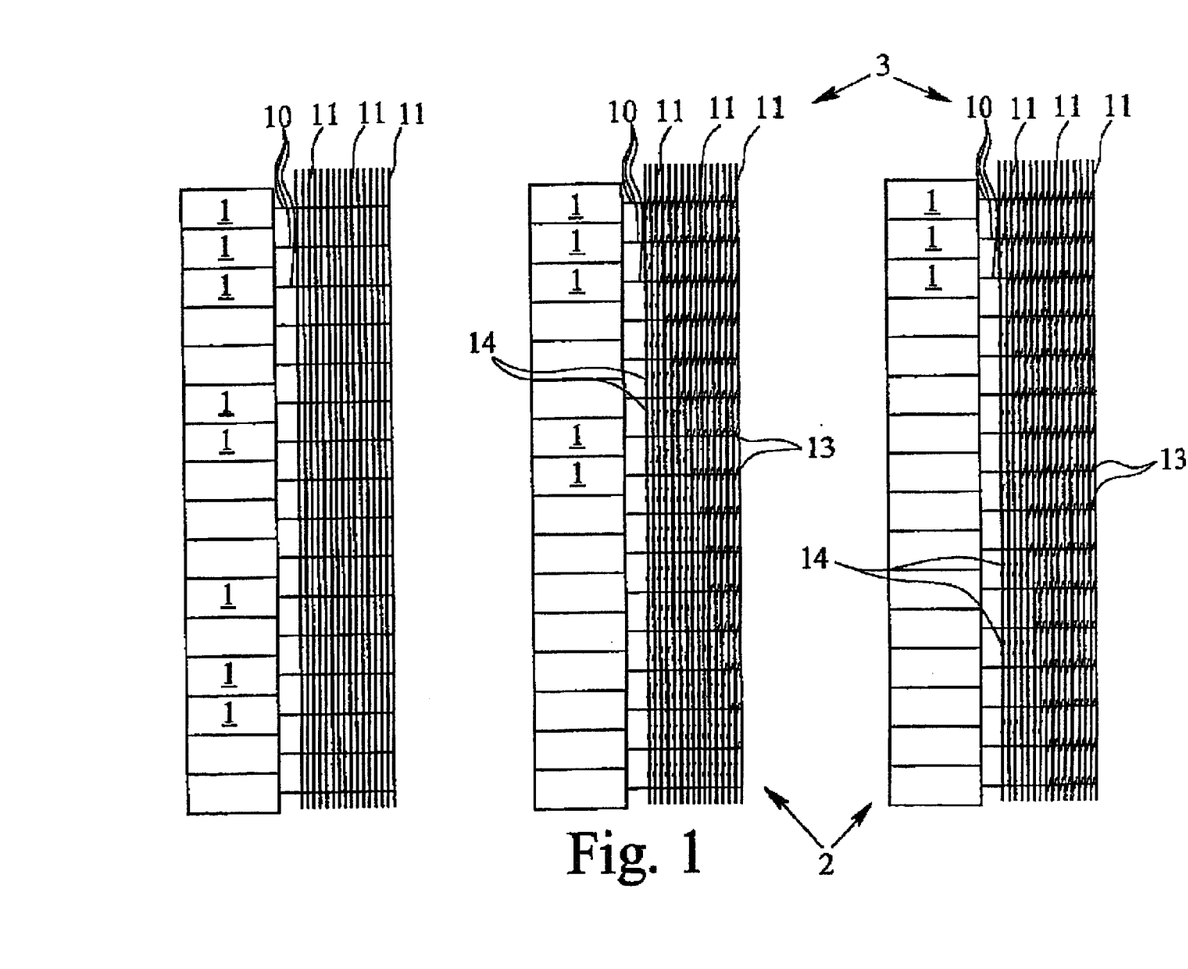
FIG. 1 shows a schematic of a starting material for a fill level sensor of a capacitive fill level measurement device in accordance with the present invention.
Figure 5:
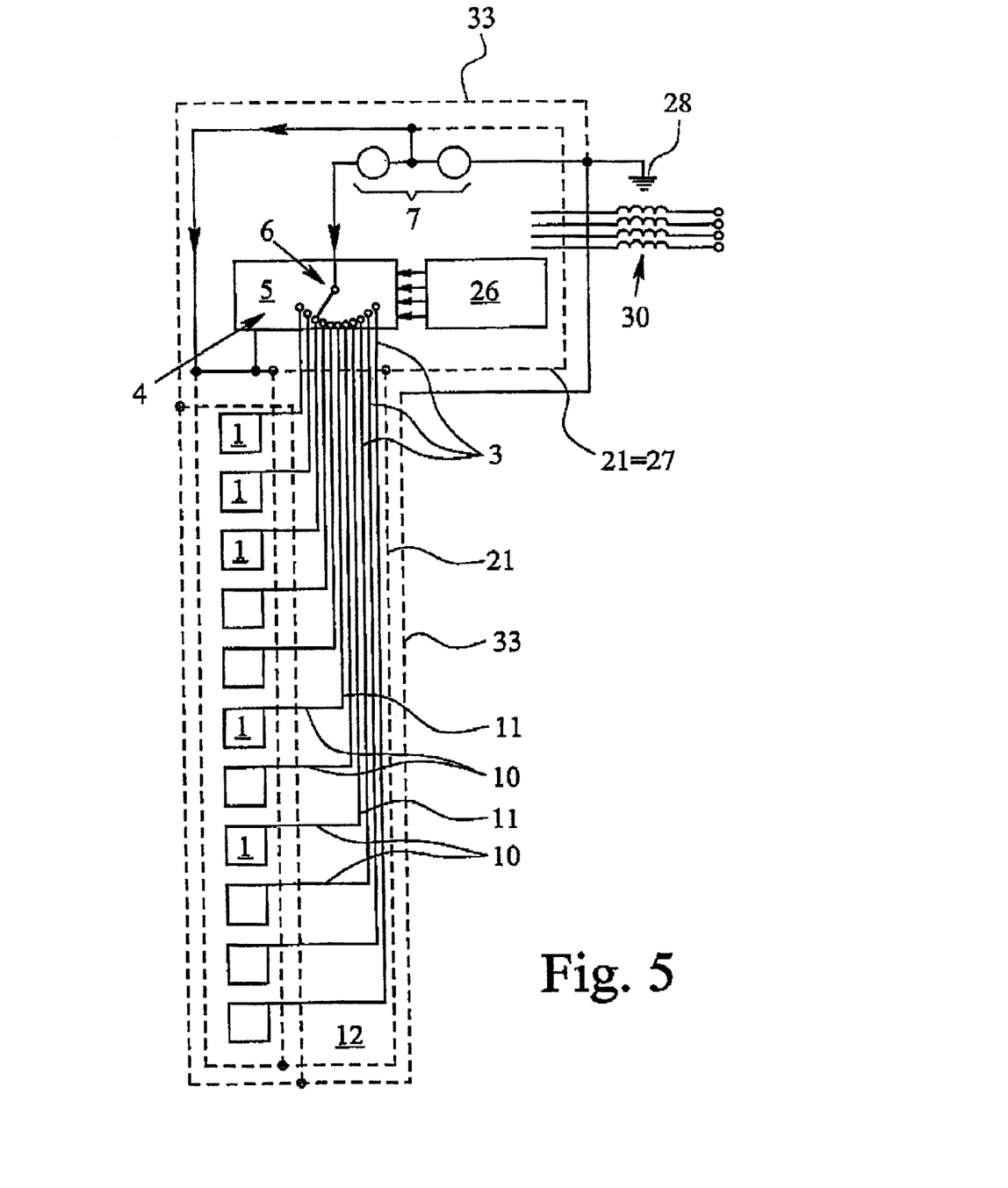
FIG. 5 shows a schematic of a capacitive fill level measurement device in accordance with the present invention.
Figure 6:
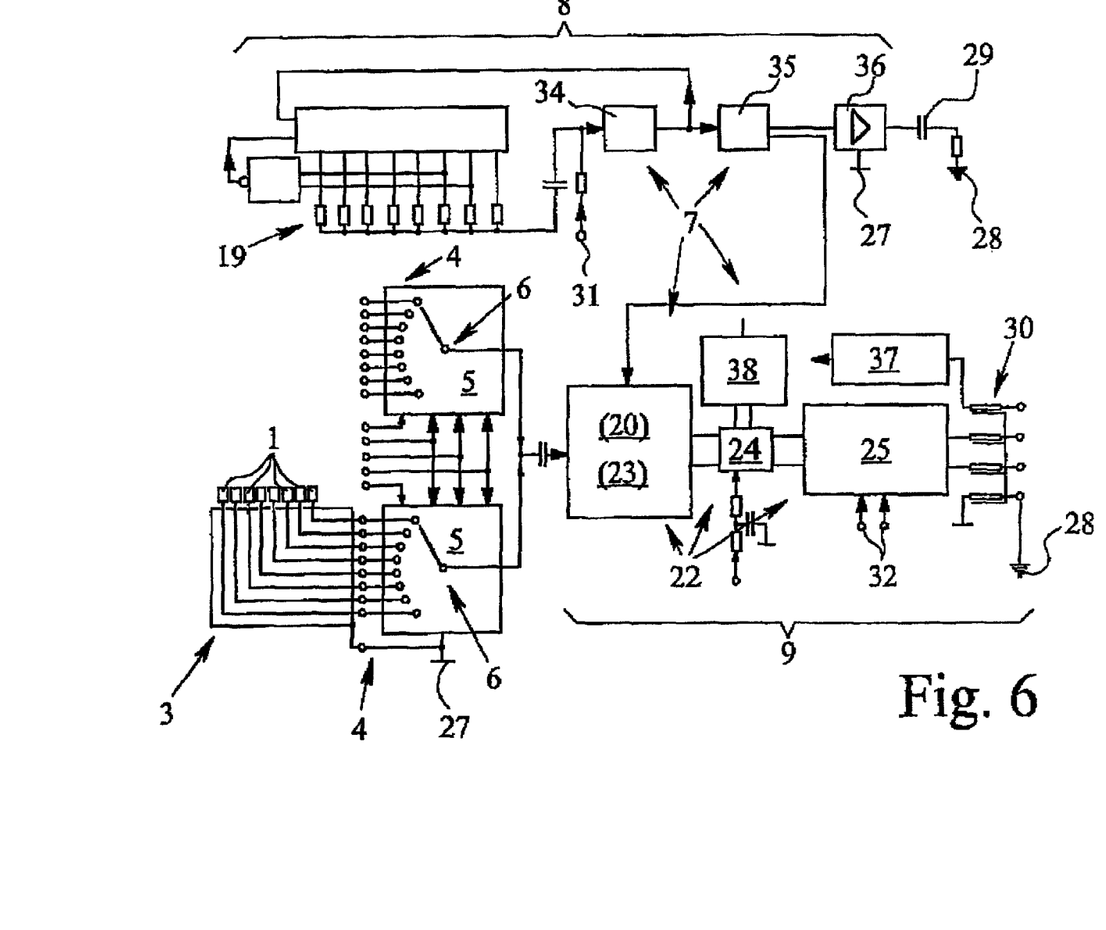
FIG. 6 shows a detailed representation of a capacitive fill level measurement device in accordance with the present invention.

And now to the drawings, in which FIGS. 1, 5 and 6 show a capacitive fill level measurement device used for capacitive acquisition of fill level of liquids, bulk materials and other loads in a closed or open container (not shown), and including a fill level sensor 2 which has a plurality of sensor fields 1, a plurality of electrical wires 3 connected to the sensor fields 1, a of a selector switch 5 connected at its multipole side 4 to respective ends of the electrical wires 3 away from the sensor fields 1, and a power supply and evaluation circuit 7 connected to the monopole side 6 of the selector switch 5, the power supply and evaluation circuit 7 including a power supply circuit 8 and an evaluation circuit 9. The sensor fields 1 of the fill level sensor 2 are made planiform and are located on top of one another, and consist preferably of a metal.

As shown in FIGS. 1, 2, 3 and 5, the capacitive fill level measurement device in accordance with the present invention is characterized by at least one of electrical-mechanical, electrical-constructional and electrical-geometrical measures. In addition to the plurality of sensor fields 1, there is a matrix of printed conductors 10 running horizontally with respect to the selector switch 5 and a matrix of printed conductors 11 running vertically (i.e., perpendicular to the conductors 10), whereby each horizontally running printed conductor 10 on one side is connected to one sensor field 1 and on the other side to a vertically running printed conductor 11, and each horizontally running printed conductor 10 with the vertically running printed conductor 11 connected to it forms an electrical line 3 or a part of an electrical line 3.

The fill level measurement device in accordance with the present invention described, therefore, has a fill level sensor 2 which is made such that the plurality of sensor fields 1 are implemented, activated, or connected to the electrical wires 3 or provided with electrical wires 3 in a unique manner. The feature of the fill level sensor 2 is mainly that the matrix provided next to the plurality of sensor fields 1 consisting of horizontally running printed conductors 10 and of vertically running printed conductors 11 makes it possible to use a starting material for the fill level sensor 2, which material can be used for a host of different applications and thus, in different fill level measurement devices.

Figure 2:
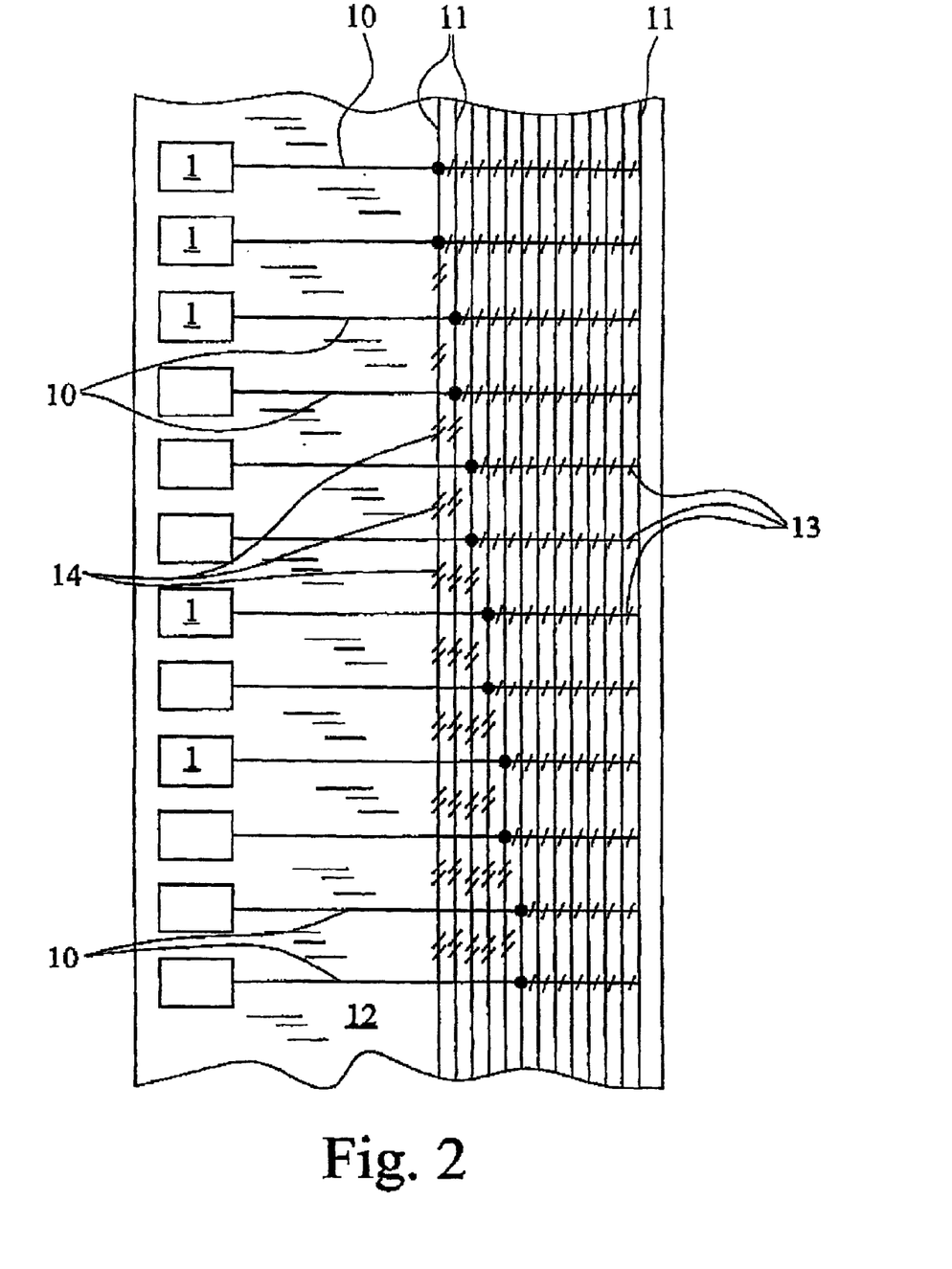
FIG. 2 shows an enlarged extract of FIG. 1.
Figure 3:
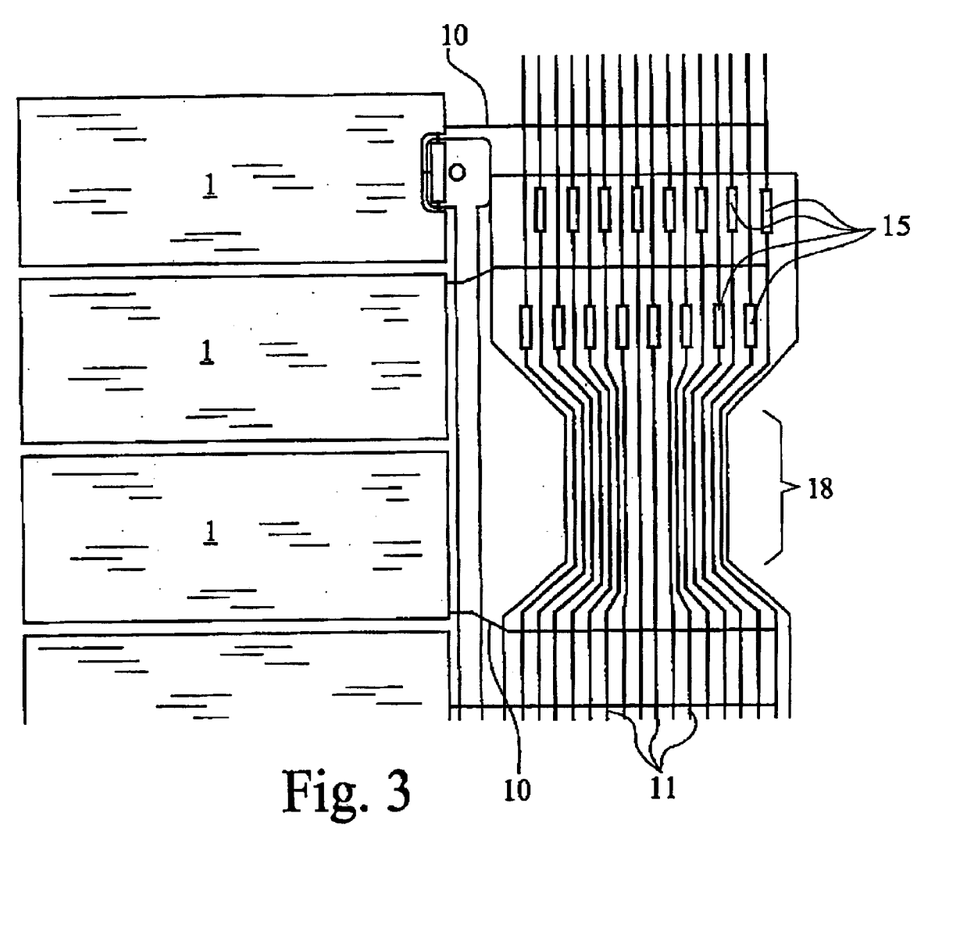
FIG. 3 shows a detailed view of a fill level sensor of a capacitive fill level measurement device in accordance with the present invention.
Figure 4A:
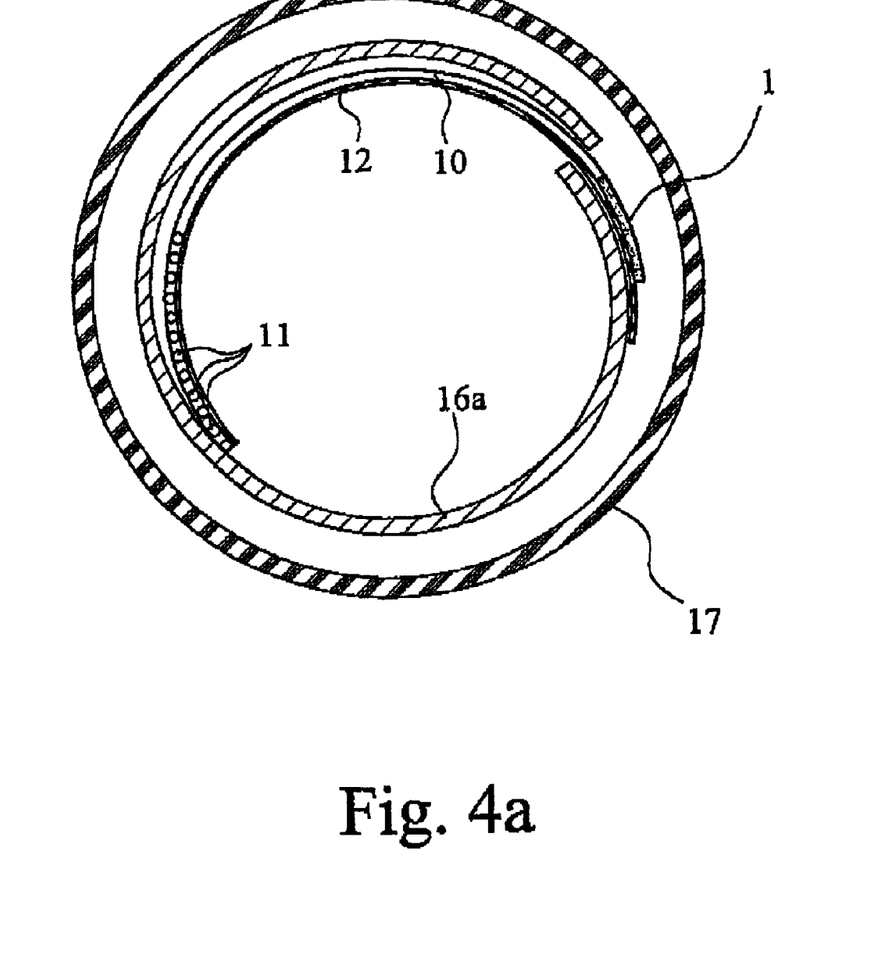
FIG. 4a shows a sectional view of an embodiment of a capacitive fill level measurement device in accordance with the present invention.
Figure 4B:
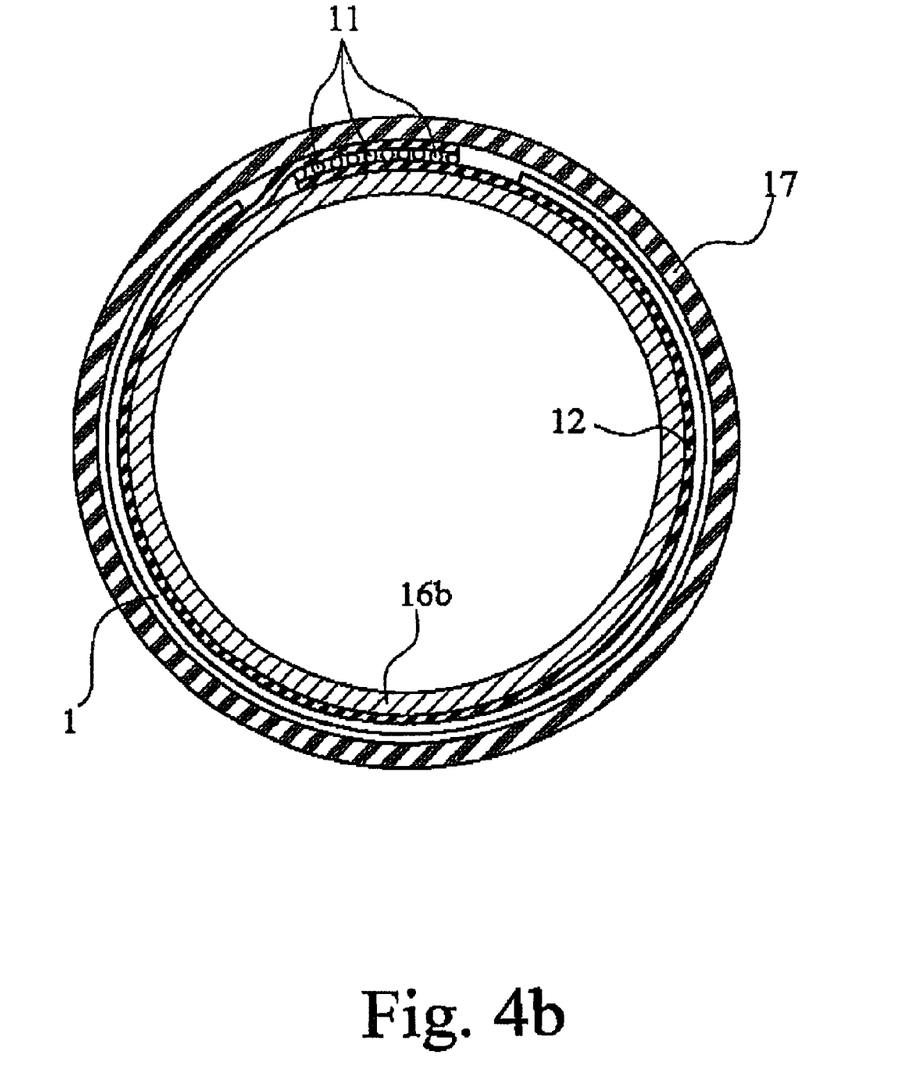
FIG. 4b shows a sectional view of a second embodiment of a capacitive fill level measurement device in accordance with the present invention.

One such starting material, as is shown in FIGS. 1 to 4, consists of a conductor support 12 which is made preferably planiform and which can only be recognized in FIG. 4, of a plurality of sensor fields 1 which are made on top of one another in one plane parallel to the plane of the conductor support 12, which are made planiform and which are provided on the conductor support 12, and of a matrix provided next to the plurality of sensor fields 1 consisting of horizontally running printed conductors 10 and vertically running printed conductors 11, first of all, as shown in FIG. 1, the horizontal printed conductors 10 are electrically connected to the vertical printed conductors 11. In the starting material shown in FIG. 1, the fill level sensor 2 including a plurality of sensor fields 1, the horizontal printed conductors 10 and the vertical printed conductors 11 are electrically connected among one another and to one another. Therefore, the sensor fields 1, horizontal printed conductors 10 and vertical printed conductors 11 are at the same potential. This, of course, is not functionally compatible for later use of a specific fill level sensor 2 for a specific capacitive fill level measurement device.

Consequently, the starting material shown in FIG. 1 must be processed in a special way for the fill level sensor 2. Specifically, except for the horizontal printed conductors 10 and the vertical printed conductors 11 which are to be connected to one another as necessary for operation, all other horizontal printed conductors 10 and all other vertical printed conductors 11 are separated such that only the horizontal printed conductors 10 and the vertical printed conductors 12 are in fact connected to one another. This is shown in the middle section of FIG. 1 and in the right-hand section of FIG. 1 and in FIG. 2, and suggested in FIG. 5. In the middle and in the right-hand section of FIG. 1 and in FIG. 2, the points 13 of separation of the horizontally running printed conductors and the points 14 of separation of the vertically running printed conductors 11 are suggested by short oblique slashes. The points of separation 13, 14 can preferably be made using a laser beam. FIGS. 1 and 2 show that the points of separation 13, 14 lie horizontally next to one another. But, it can also be recommended that the points of separation 13, 14 be made offset, therefore, diagonal. In this way the danger of breaking when the conductor support 12 is bent and/or folded is reduced.

In the embodiments shown in FIG. 1, each fill level sensor 2 has sixteen sensor fields 1, sixteen horizontally running printed conductors 10 and sixteen vertically running printed conductors 11. In the middle section shown in FIG. 1, one sensor field 1 at a time is connected to its vertical printed conductor 11 via a horizontal printed conductor 10. The uppermost sensor field 11 is connected via the uppermost horizontal printed conductor 10 to the vertical printed conductor 11, and only this one. The sensor field 1 which is the second when viewed from the top is connected via the second horizontal printed conductor 10 to the second vertical printed conductor 11 and only to this, and the lowermost sensor field 1 is connected via the lowermost horizontal printed conductor 10 to the vertical printed conductor 11 which is on the right edge and only to this one.

Differently than in the embodiment shown in the middle section of FIG. 1, the embodiment shown in the right section of FIG. 1 has two sensor fields 1 connected to the vertical printed conductor 11 via two horizontal printed conductors 10. In this embodiment, therefore, two sensor fields 1 at a time are electrically connected to one another. Of the initial sixteen sensor fields, therefore, eight sensor fields 1 of twice the size, specifically twice the height, are implemented to be electrically active. It goes without saying that more than two sensor fields 1 can also be electrically connected to one another, specifically by several horizontal printed conductors 10 of several sensor fields 1 being connected to one vertical printed conductor 11.

In the capacitive fill level measurement device in accordance with the present invention, as stated, between the plurality of sensor fields 1 of the fill level sensor 2 and the selector switch 5 are electrical wires 3, and the above explained horizontal printed conductors 10 and the vertical printed conductors 11 can represent the electrical wires 3. However, one horizontally running printed conductor 10 or several horizontally running printed conductors 10 with the vertically running printed conductor 11 forms part of the electrical line 3, i.e. that between the vertically running printed conductor 11 and the selector switch 5 the electric line 3 must still be added. Therefore, in the embodiment suggested in FIG. 3, the vertically running printed conductors 11 are provided with widened areas 15 which can be used as solder surfaces. In order for the widened areas 15 to have an area as large as possible at the given distance of the vertically running printed conductors 11, these widened areas 15, offset from printed conductor 11 to printed conductor 11, are made in two rows.

One major advantage of the above described embodiment is that the starting material for a fill level sensor 2 can be produced in a great length so that fill level sensors 2 with a varied number of sensor fields 1 can be formed from one such starting material. In doing so, it is preferred that providing the vertically running printed conductors 11 with widened areas 15 be repeated at regular intervals. With the above described fill level sensor 2, quite different fill level measurement devices can be built, specifically fill level measurement devices for acquiring or determining the fill level of loads with quite different dielectric constants and for acquiring or determining the fill level of loads in quite different containers. In particular, the above described fill level sensors 2 can be applied either planiform to the outside of an electrically "transparent" container, or preferably, when made rod-shaped, they can be placed in the container.

For both embodiments it is recommended that the plurality of sensor fields 1 and the printed conductors 10, 11 be made on a flexible conductor support 12, for example, a film conductor support 12. A fill level sensor 2 made using a film conductor support 12 can be easily applied planiform to the outside of an electrically "transparent" container, but can also be used for a rod-shaped embodiment. It is pointed out here for the sake of clarity that "planiform embodiment" or "rod-shaped embodiment" only ever mean the area of the capacitive fill level measurement device in accordance with the present invention with which or in which the fill level sensor 2 is formed. In addition, the capacitive fill level measurement device in accordance with the present invention includes an area in which especially the selector switch 5 and the power supply and evaluation circuit 7 are formed. This area can be formed independently of how the area of the fill level sensor 2 is made.

For the rod-shaped embodiment there is a plurality of quite different possible implementations. In all possible implementations it is recommended that the fill level sensor 2 which is made using a flexible conductor support 12 be rolled together around a vertical axis. In doing so the horizontal printed conductors 10 can be at least partially surrounded by the plurality of sensor fields 1. The vertical printed conductors 11 can also be at least partially surrounded by the sensor fields.

As suggested in FIG. 4*a*, one preferred embodiment of a capacitive fill level measurement device in accordance with the present invention with a rod-shaped fill level sensor 2 can be formed by using a vertically-extending cylindrical hollow body 16*a* which is slotted in the longitudinally. A plurality of sensor fields 1 are located on the outside periphery of the hollow body 16*a*, horizontal printed conductors 10 are located at least partially in the inner periphery of the hollow body 16*a* and the vertical printed conductors 11 are located in the inner periphery of the hollow body 16*a*. Preferably, the hollow body 16*a* is made electrically conductive, especially since it is composed preferably of metal. In the embodiment shown in FIG. 4*a*, the fill level sensor 2 is located inside a closed, electrically insulative outer tube 17. Instead of an outer tube 17, the fill level sensor 2 can be located inside a heat shrinkable sleeve.

FIG. 4*b* shows a rod-shaped implementation of the fill level sensor 2 which is characterized in that there is a vertically extending, annular cylindrical carrier rod 16*b*, and a conductor support 12 wound around the carrier rod 16*b*. The conductor support 12 is attached overlapping and closely bordering, for example, cemented on the carrier rod 16*b*, and the vertical printed conductors 11 are implemented in the overlapping area of the printed conductor 12. As in the embodiment shown in FIG. 4*a*, the fill level sensor 2 is located inside a closed, electrically insulative outer tube 17, preferably composed of plastic. The carrier rod 16*b* with the conductor support 12 is located closely adjacent in the outer tube 17.

As was explained above, it is especially advantageous if the plurality of sensor fields 1 and/or the electric wires 3 and/or the selector switch 5 are conductive. Preferably, the conductor support 12 is made electrically conductive at least in the area of the plurality of sensor fields 1 on the side facing away from the plurality of sensor fields 1. In addition, it is recommended that the conductor support 12 also be made electrically conductive in the area of the printed conductors 10, 11 on the side facing away from the printed conductors 10, 11. In particular, the sensor fields and the printed conductors 10, 11 can be conductive by the conductor support 12 being provided with a conductor in the form of a Faraday surface.

In the embodiment shown in FIG. 3, the vertically running printed conductors 11 are made "constricted" at least once whereby the width over all vertical printed conductors 11 in the area of the constriction 18 corresponds at most to half the width over all vertical printed conductors 11 in the normal area. Because the vertically running printed conductors 11 and the conductor support 12 have a constriction 18, it is easily possible to bend or kink the conductor support 12 with the vertical printed conductors 11 provided thereon, even if the fill level sensor 2 made using a flexible conductor support 12 is rolled together around a vertical axis.

It was already stated above that the subject matter of the invention is also a special starting material for the fill level sensor 2 of a capacitive fill level measurement device in accordance with the present invention. In addition, the starting material can be characterized in that the plurality of sensor fields 1, the matrix of horizontal printed conductors 10 and the vertical printed conductors 11 are made as a lining on the conductor support 12 which is continuously bonded, preferably, as a copper lining. The shielding of the plurality of sensor fields 1 and the horizontal printed conductors 10 and vertical printed conductors 11 can also be accomplished as a bonded lining, preferably as a copper lining.

With reference to the capacitive fill level measurement device in accordance with the present invention, so far essentially electrical-mechanical, electrical-constructional or electrical-geometrical measures have been described. Below, especially in conjunction with FIGS. 5 and 6, electrical-functional and electronic-functional measures will be described which represent a another embodiment. It was stated above that preferably the power supply and evaluation circuit 7 delivers a high frequency power supply voltage, whereby the power supply voltage is frequency-spread by a noise signal originating from a noise source 19. The frequency-spread power supply voltage leads to a frequency-spread measurement quantity, specifically, to a frequency-spread measurement current, and the frequency-spread power supply voltage is placed at the first input of the correlator 20. Moreover, the frequency-spread measurement quantity is placed at the second input of the correlator 20 and that the output signal of the correlator 20 is supplied to the other evaluation circuit. With respect to what can be achieved in particular by the frequency spreading of the power supply voltage and along with this by the frequency spreading of the measurement quantity and how the teaching "frequency spreading" can be implemented in particular, in order to avoid repetitions reference is made to the disclosure contents of German patent disclosure document 198 13 013.

As shown in FIGS. 5 and 6, other electrical-functional and electronic-functional measures are described which are especially advantageous to use in the fill level measurement devices in accordance with the present invention. This applies to the measure of assigning a electrically conductive shield 21 to the plurality of sensor fields 1 and/or the electrical wires 3 and/or the selector switch 5, specifically, a shield which is always at a potential which corresponds to the potential of the plurality of sensor fields 1, the electrical wires 3 and the selector switch 5. In this connection special importance is assigned to the measure of connecting the shield 21 via a current measurement circuit 23 to the plurality of sensor fields 1, the electrical wires 3 and the selector switch 5. A current measurement circuit 22 is used which has an essentially negligibly small internal resistance. The current measurement circuit 23 can consist of a synchronous rectifier 23, a lowpass 24 connected downstream of the synchronous rectifier 23, and a current-voltage converter 25 which is connected downstream of the lowpass 24. In the current measurement circuit 22 the synchronous rectifier 23 and the downstream lowpass 24 lead to the fact that a direct current is formed from the high frequency line current which is supplied on the inlet side and from it then a DC voltage is formed by the current-voltage converter 25.

It is stated above that a multiplexer can be used as the selector switch 5 whereby the selector switch 5 is made as a multiplexer and the plurality of electrical wires 3 are connected to the multipole side 4 of the switch 5, while its monopole side 6 is connected to the power supply and evaluation circuit 7. It is suggested in FIG. 5 that the selector switch 5 is triggered by a control part 26 which has an oscillator and a counter. In the embodiment shown in FIG. 6, there are two selector switches 5 made as multiplexers, eight terminals at a time being implemented on the multipole side 4. In the capacitive fill level measurement device shown in FIGS. 5 and 6, the power supply voltage made available by the power supply and evaluation circuit 7 is between a frame potential 27 and a ground potential 28; therefore a "floating" frame potential 27 is accomplished. Of course, provisions must be made so that the frame potential 27 and the ground potential 28 are not connected to one another without impedance. As is shown in FIG. 6, the power supply circuit 8 of the power supply and evaluation circuit 7 is connected dc-decoupled to the ground potential 28, for example, by a decoupling capacitor 29, and the evaluation circuit 9 of the power supply and evaluation circuit 7 is connected ac-decoupled to the ground potential 28, for example, by current-compensated interaction limiting reactors 30.

As previously mentioned, the fill level measurement device in accordance with the present invention can be used for acquiring or determining the fill level of loads with quite different dielectric constants and for acquiring or determining the fill level of loads in quite different containers. To accomplish this, in an exemplary embodiment of the present invention shown in FIG. 6 is characterized in that the frequency of the power supply voltage is controlled by a microprocessor (not shown) which intervenes at a control point 31, and that the gain of the evaluation circuit 9 of the power supply and evaluation circuit 7 can be controlled by a microprocessor (not shown) which intervenes at a control point 32.

The embodiments of the capacitive fill level measurement devices in accordance with the present invention shown in FIGS. 5 and 6 further includes a second electrically conductive shield 33 at the ground potential 28 whereby the second electrically conductive shield 33 is used to shield the first electrically conductive shield 21. In addition, the power supply circuit 8 of the power supply and evaluation circuit 7 includes a voltage-controlled oscillator 34 and a digital phase shifter 35, while the evaluation circuit 9 of the power supply and evaluation circuit 7 includes a voltage regulator 37 and a clamp circuit 38. In the evaluation circuit described so far the plurality of sensor fields 1 are used as receivers. However, it can also be advantageous to use the plurality of sensor fields 1 as transmitters. The plurality of sensor fields 1 which are not active are then not high-resistance, but low-resistance, and can be used as shielding so that the shielding of the conductor supports 12 described further above on the side away from the printed conductors 10, 11 can be omitted. If the plurality of sensor fields 1 are used as transmitters, the plurality of sensor fields 1 need not have a capacitively-dictated minimum distance from one another so that almost seamless implementation of the individual sensor fields 1 is possible. In the above described evaluation principle in which the plurality of sensor fields 1 are used as transmitters, the hollow body 16a or the carrier rod 16b can consist of metal of another conductor, since strong capacitive coupling does increase the power demand, but does not reduce the sensitivity.

We claim:

1. A capacitive fill level measurement device comprising:
   a fill level sensor having a plurality of sensor fields, said plurality of sensor fields being composed of metal and mounted on top of one another;
   a selector switch electrically connected on a multiple side to said plurality of sensor fields;
   a power supply and evaluation circuit electrically connected to a monopole side of said selector switch; and
   a matrix of vertically extending printed conductors and horizontally extending printed conductors so as to electrically connect said selector switch to said plurality of sensor fields,
   wherein each horizontally extending printed conductor is connected at one end to a respective one of said plurality of sensor fields and at an opposing end to a respective one of said vertically, extending printed conductors, wherein a plurality of said horizontally extending printed conductors are connected to a respective one of said vertically extending printed conductors, wherein said vertically extending printed conductors are provided with widened areas for use as solder surfaces, and wherein said widened areas are aligned in rows that are offset from each of the vertically extending printed conductors to the next of the vertically extending printed conductors.

2. The capacitive fill level measurement device as claimed in claim 1, wherein at least one of said plurality of sensor fields and said printed conductors are mounted on a flexible conductor support.

3. The capacitive fill level measurement device as claimed in claim 2, wherein said fill level sensor is rolled around a vertical axis.

4. The capacitive fill level measurement device as claimed in claim 3, wherein said horizontally extending printed conductors are at least partially surrounded by said plurality of sensor fields.

5. The capacitive fill level measurement device as claimed in claim 4, wherein said vertically extending printed conductors are at least partially surrounded by said plurality of sensor fields.

6. A capacitive fill level measurement device comprising:
   a fill level sensor having a plurality of sensor fields, said plurality of sensor fields being composed of metal and mounted on top of one another;
   a selector switch electrically connected on a multiple side to said plurality of sensor fields;
   a power supply and evaluation circuit electrically connected to a monopole side of said selector switch;
   a matrix of vertically extending printed conductors and horizontally extending printed conductors so as to electrically connect said selector switch to said plurality of sensors, wherein each horizontally extending printed conductor is connected at one end to a respective one of said plurality of sensor fields and at an opposing end to a respective one of said vertically extending printed conductors, wherein at least one of said plurality of sensor fields and said printed conductors are mounted on a flexible conductor support and, wherein said fill level sensor is rolled around a vertical axis; and a cylindrical hollow body having a longitudinal slot and wherein said plurality of sensor fields are located an the outer periphery of said cylindrical hollow body, said horizontally extending printed conductors are located at least partially in the inner periphery of said cylindrical hollow body and said vertically extending printed conductors are located in the inner periphery of said cylindrical hollow body.

7. The capacitive fill level measurement device as claimed in claim 6, wherein said cylindrical hollow body is electrically conductive and is composed of metal.

8. A capacitive fill level measurement device comprising:

a fill level sensor having a plurality of sensor fields, said plurality of sensor fields being composed of metal and mounted on top of one another;

a selector switch electrically connected on a multiple side to said plurality of sensor fields;

a power supply and evaluation circuit electrically connected to a monopole side of said selector switch;

a matrix of vertically extending printed conductors and horizontally extending printed conductors so as to electrically connect said selector switch to said plurality of sensors, wherein each horizontally extending printed conductor is connected at one end to a respective one of said plurality of sensor fields and at an opposing end to a respective one of said vertically extending printed conductors, wherein at least one of said plurality of sensor fields and said printed conductors are mounted on a flexible conductor support and, wherein said fill level sensor is rolled around a vertical axis; and a cylindrical carrier rod, and wherein said conductor support is wound around the outer periphery of said cylindrical carrier rod.

9. The capacitive fill level measurement device as claimed in claim 8, wherein said conductor support is electrically conductive at least in an area proximate to said plurality of sensor fields on a side facing away from said plurality of sensor fields.

10. The capacitive fill level measurement device as claimed in claim 9, wherein said conductor support is electrically conductive in an area proximate to said printed conductors on a side facing away from said printed conductors.

11. The capacitive fill level measurement device as claimed in claim 10, wherein said conductor support is provided with at least one electrically conductive which is made in the form of a Faraday surface.

12. The capacitive fill level measurement device as claimed in claim 8, wherein the horizontal printed conductors and/or the vertical printed conductors are at least partially surrounded by the plurality of sensor fields.

13. The capacitive fill level measurement device as claimed in claim 8, wherein the conductor support is attached overlapping and closely bordering on the carrier rod and the vertical printed conductors are implemented in said overlapping area of the printed support.

14. The capacitive fill level measurement device as claimed in claim 12, wherein said vertically extending printed conductors are constricted at least once.

15. The capacitive fill level measurement device as claimed in claim 13, wherein the width over each of said vertically extending printed conductors in an area proximate to said constriction corresponds at most to one half the width over each of said vertically extending printed conductors in a non-constricted area.

* * * * *